United States Patent [19]

van der Lely

[11] 4,072,196

[45] Feb. 7, 1978

[54] CULTIVATORS

[76] Inventor: Cornelis van der Lely, 7, Bruschenrain, Zug, Switzerland

[21] Appl. No.: 575,831

[22] Filed: May 8, 1975

[30] Foreign Application Priority Data

May 10, 1974 Netherlands .......................... 7406292

[51] Int. Cl.² .............................................. A01B 33/06
[52] U.S. Cl. ...................... 172/49; 172/59; 172/68; 172/71; 172/97; 172/103; 172/125
[58] Field of Search ...................... 172/59, 97, 60, 103, 172/58, 57, 125, 523–526, 776, 71, 72, 49, 91–95, 545

[56] References Cited

U.S. PATENT DOCUMENTS

| 25,736 | 10/1859 | Hogle | 172/545 X |
|---|---|---|---|
| 493,398 | 3/1893 | Coon | 172/59 |
| 2,134,816 | 11/1938 | Fetters | 172/92 |
| 2,619,891 | 12/1952 | Sloper | 172/92 |
| 3,059,704 | 10/1962 | Kasatkin | 172/125 X |
| 3,821,989 | 7/1974 | van der Lely et al. | 172/59 |

FOREIGN PATENT DOCUMENTS

| 926,291 | 4/1947 | France | 172/92 |
|---|---|---|---|
| 606,824 | 11/1934 | Germany | 172/92 |
| 2,062,771 | 7/1971 | Germany | 172/59 |
| 1,918,929 | 11/1969 | Germany | 172/72 |
| 458,501 | 3/1928 | Germany | 172/59 |
| 408,498 | 9/1966 | Switzerland | 172/59 |
| 847,413 | 9/1960 | United Kingdom | 172/523 |
| 1,333 of | 1868 | United Kingdom | 172/59 |

Primary Examiner—Paul E. Shapiro
Attorney, Agent, or Firm—Mason, Mason & Albright

[57] ABSTRACT

A cultivator has groups of soil working members positioned in a row that extends transverse to the direction of travel. Each group includes a plurality of tined soil working members and a drive system that rotates each group as well as the individual soil working members of each group. The drive system is connectable to the p.t.o. of a tractor and comprises an elongated drive shaft that is geared to the central shaft of each group and a sun pinion of each central shaft is meshed with planet pinions on the shafts about which the soil working members rotate. The pinion gears of each group are housed in a circular disc-shaped casing so that the entire casing of each group rotates about its central shaft during operation. A forward coupling member is attached to the frame for connection to the tractor and a rear support roller provides support to regulate the working depths of the soil working members.

11 Claims, 2 Drawing Figures

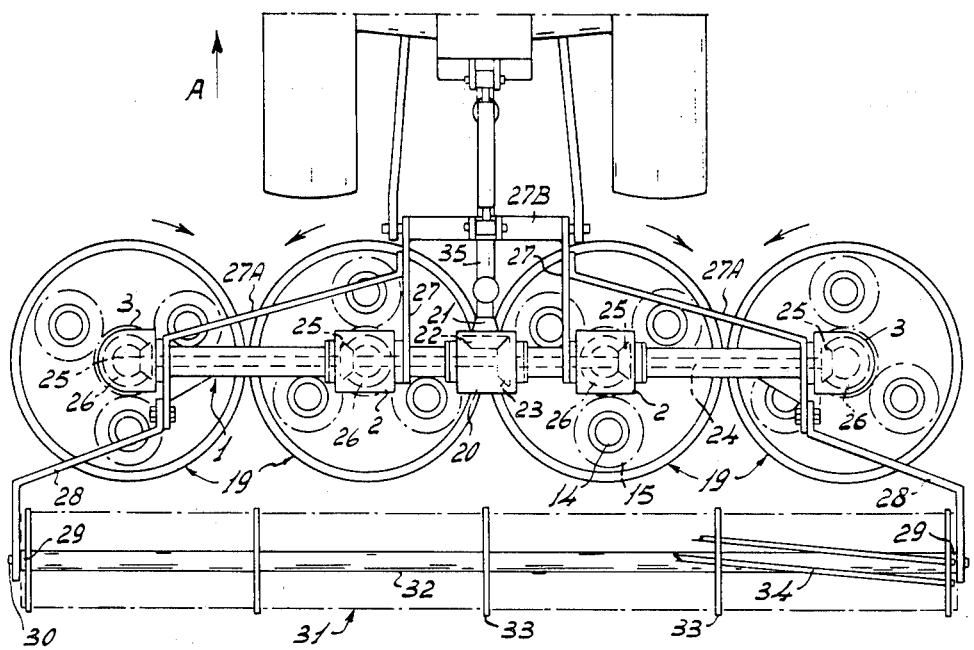
FIG. 1
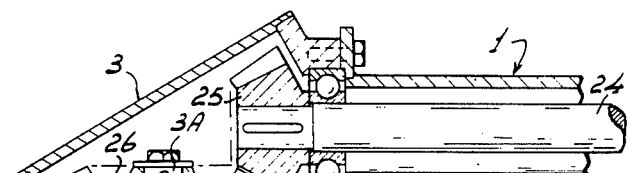
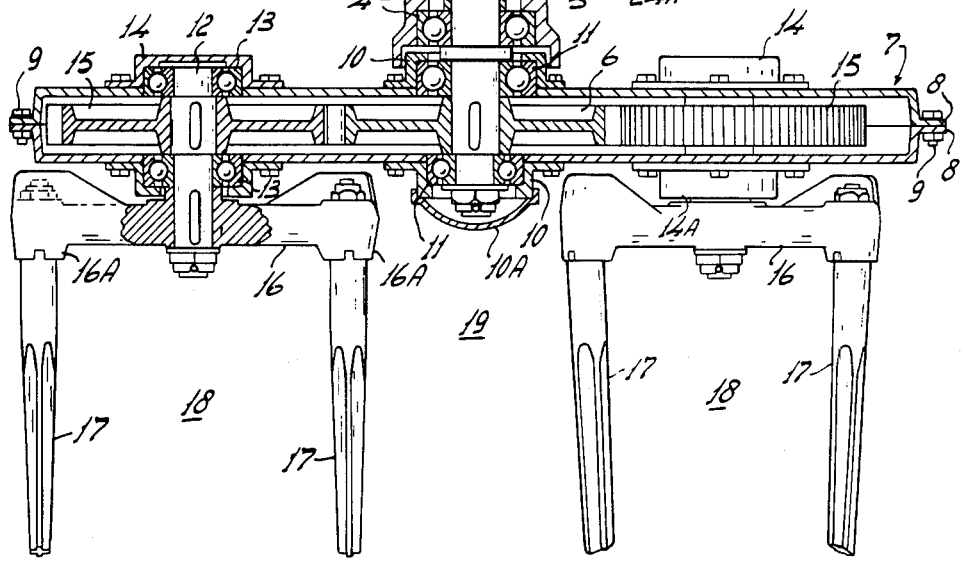
FIG. 3

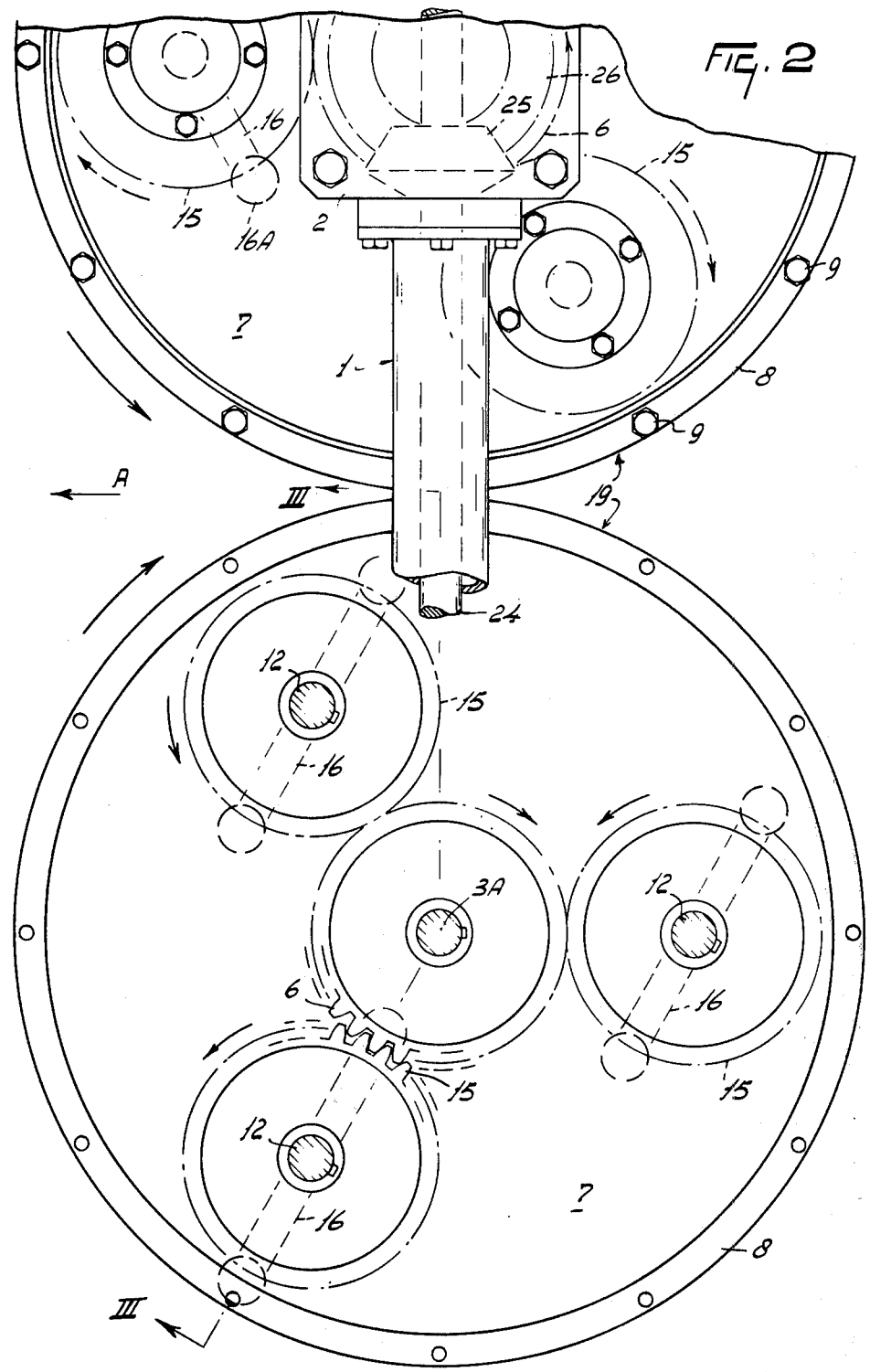

CULTIVATORS

According to one aspect of the invention, there is provided a cultivator of the kind set forth, wherein a plurality of groups of the soil working members are arranged in side-by-side relationship in such a way that said groups will work at least adjoining strips of land during the use of the cultivator, and wherein the soil working members of each group are rotatable, during operation, about said corresponding axes and also about a common axis for that group.

For a better understanding of the invention, and to show how the same may be carried into effect, reference will now be made, by way of example, to the accompanying drawings, in which:

FIG. 1 is a plan view of a cultivator in accordance with the invention connected to the rear of an agricultural tractor, FIG. 2 is a plan view, to an enlarged scale, illustrating the construction and arrangement of two immediately neighbouring groups of soil working members of the cultivator in greater detail, FIG. 3 is a section taken on the line III—III in FIG. 2.

Referring to FIGS. 1 to 3 of the drawings, the cultivator which is illustrated has a frame which is afforded principally by a tubular support 1 that extends substantially horizontally transverse, and normally substantially horizontally perpendicular, to the intended direction of operative travel of the cultivator which is indicated in several Figures of the drawings by an arrow A. The tubular support 1 carries two gear boxes 3 at its opposite ends and two further gear boxes 2 at regularly spaced intervals along the length of the support 1 which intervals are such that all four of the gear boxes 2 and 3 are regularly spaced apart from one another by distances which are preferably, but not essentially, substantially 75 centimeters. The two gear boxes 2 that are closest to the center of the cultivator are of substantially cuboid shape whereas the two gear boxes 3 that are carried at the opposite ends of the tubular support 1 have their terminal extremities rounded off (see FIG. 1) and their tops downwardly inclined towards those terminal extremities (see FIG. 3). Each of the gear boxes 2 and 3 comprises a corresponding vertical or substantially vertical shaft 3A having an upper portion that is rotatably mounted in the corresponding gear box and a lower portion that projects from beneath the bottom thereof. Each shaft 3A is rotatably mounted in a housing 5 at the bottom of the gear box 2 or 3 concerned by upper and lower ball bearings 4 that are spaced apart from one another by a short distance lengthwise along the shaft 3A. The lower portion of each shaft 3A that projects from beneath the bottom of the corresponding housing 5 is provided, towards its lowermost end, with a corresponding straight- or spur-toothed pinion 6 which is located inside a corresponding circular disc-shaped casing 7. The general plane of each casing 7 is substantially perpendicular to the longitudinal axis of the corresponding shaft 3A and each casing 7 is afforded by two identical upper and lower shells, one of which is inverted with respect to the other, both shells being formed around their outer edges with rims 8 which are clamped together by small bolts 9 to close the casings 7. Each of the identical casing shells is formed from sheet material which is preferably, but not essentially, sheet steel. Each of the casings 7 affords a common support for a corresponding group of soil working members which will be described below and is rotatable about the corresponding shaft 3A with the aid of corresponding upper and lower ball bearings 11 that are disposed above and beneath the corresponding pinions 6 in bearing housings 10. The shafts 3A project through the lower bearing housings 10 and each of those lower bearing housings is provided with a corresponding resilient cover 10A (FIG. 3) of inverted domed configuration. The circular disc-shaped casings 7 can easily be manufactured from sheet steel and are not heavy in weight.

Three substantially vertical shafts 12 that are parallel to the corresponding shafts 3A are rotatably journalled in each of the four casings 7 with the aid of corresponding upper and lower ball bearings 13 disposed in upper bearing housings 14 and lower bearing housings 14A which are fastened to the upper and lower casing shells by small bolts. As will be evident from FIGS. 1 and 2 of the drawings, the three shafts 12 that correspond to each casing 7 are equidistantly spaced from the corresponding shaft 3A and are disposed at regular angular intervals of substantially 120° around that shaft. Each shaft 12 is provided, internally of the corresponding casing 7, with a corresponding straight- or spur-toothed pinion 15 that is of the same size as the corresponding pinion 6 and whose teeth are in mesh with those of that pinion 6. Thus, each pinion 6 constitutes a sun wheel and the three pinions 15 whose teeth are in meshing engagement therewith constitute planet wheels of a sun and planet system that includes the corresponding central shaft 3A. Each shaft 12 projects from beneath the bottom of the corresponding bearing housing 14A and is there secured to the center of a corresponding substantially horizontal tine support 16 which has two substantially vertically disposed cylindrical tine holders 16A at its opposite ends. The tine holders 16a receive upper fastening portions of soil working elements in the form of rigid tines 17 that have lower active or soil working portions which are inclined to the fastening portions in such a way that they trail rearwardly by a few degrees with respect to the intended directions of rotation of the shaft 12 concerned (indicated by arrows in FIG. 2). Each pair of tines 17 has its two tines located at diametrically opposite sides of the corresponding shaft 12. Each of the pinions 6 and 15 has a diameter of substantially 25 centimeters so that the distance between one of the shafts 3A and each of the three corresponding shafts 12 is also substantially 25 centimeters. Each tine support 16, its holders 16A and the corresponding pair of tines 17 constitutes a soil working member 18 which has an effective working diameter of substantially 30 centimeters since, as can be seen in FIGS. 2 and 3 of the drawings, the active or soil working portions of the tines 17 are spaced apart by a greater distance than the diameter of each of the pinions 6 or 15. Each driving shaft 3A, the corresponding three soil working members 18 and their common support (constituted by the corresponding casing 7) constitute a group 19 of three soil working members.

The cultivator that is illustrated in FIGS. 1 to 3 of the drawings has four groups 19 of soil working members that are arranged in side-by-side relationship in a single row. The arrangement is such that the rims 8 of the immediately neighbouring casings 7 thereof actually touch each other or are spaced apart by a very short distance indeed. With this arrangement, the strips of land that are worked by the three members 18 of each group 19 also adjoin each other to produce a single broad strip of worked soil when the cultivator is in operation. The tubular support 1 is provided with a gear box 20 that is located midway along its length between the two gear boxes 2. A substantially horizontal rotary input shaft 21 projects forwardly from the front of the gear box 20 in substantially the direction A and carries, inside the gear box 20, a bevel pinion 22. The teeth of the bevel pinion 22 are in driving mesh with those of a further bevel pinion 23 that is secured to a shaft 24 which extends throughout substantially the whole of the length of the tubular support 1 internally of the latter. The shaft 24 is rotatably supported by ball bearings 24A (FIG. 3) in walls of all four of the gear boxes 2 and 3, inside each of those gear boxes, said shaft 24 carries a corresponding bevel pinion 25. The teeth of the four bevel pinions 25 are in driving mesh with those of four larger bevel pinions or crown wheels 26 that are fastened to the uppermost ends of the corresponding four shafts 3A inside the gear boxes 2 and 3. The arrangement of the pinions 25 and 26 inside the four gear boxes is such that, during operation of the cultivator, immediately neighbouring pinions 26 and the corresponding shafts 3A to which they are secured will rotate in the opposite directions that are indicated by arrows in FIG. 1 of the drawings.

Supports 27 that extend substantially parallel to the direction A are rigidly secured to the tubular housing 1 near the sides of the two gear boxes 2 that face the central gear box 23. The supports 27 are rigidly connected by struts 27A to locations on the tubular support 1 that are disposed immediately inwardly along that support from the two end gear boxes 3. The fronts, with respect to the direction A, of the supports 27 are secured to a coupling member or trestle 27B that is preferably of generally triangular configuration, said coupling member or trestle 27B being constructed and arranged for connection to the three-point lifting device or hitch at the rear of an agricultural tractor or other operating vehicle in a manner which is generally known per se and which can be seen in outline in FIG. 1 of the drawings. The rearmost ends of the two struts 27A that are located behind the tubular support 1 with respect to the direction A are secured to the leading ends of corresponding arms 28 by substantially horizontally aligned pivot bolts or the like. The arms 28 extend rearwardly from their pivotal connections to the struts 27A and outwardly towards the opposite sides of the path of travel of the cultivator in rearwardly divergent relationship, their rearmost ends, however being substantially parallel to the direction A as seen in plan view. Said rearmost ends carry substantially horizontally aligned bearings 29 that rotatably receive stub shafts 30 at the opposite ends of a rotatable supporting member in the form of an open ground roller that is generally indicated by the reference 31. The ground roller 31 extends substantially horizontally perpendicular to the direction A throughout substantially the whole of the working width of the cultivator and has a central tubular part 32 to which a plurality, such as five, of substantially vertical supports 33 are secured in regularly spaced apart realtionship. A plurality of elongated elements 34 are received in holes around the periphery of the support 33 and said elements 34 are wound helically around the tubular part 32, in regularly spaced apart relationship with each other and in spaced relationship with said part 32, while extending generally lengthwise of the roller 31 around its axis of rotation.

In the use of the cultivator that has been described with reference to FIGS. 1 to 3 of the drawings, its coupling member or trestle 27B is connected to the three-point lifting device or hitch at the rear of an agricultural tractor or other operating vehicle and its rotary input shaft 21 is placed in driven connection with the power take-off shaft of the same tractor or other vehicle by way of an intermediate telescopic transmission shaft 35, that is of a construction which is known per se, having universal joints at its opposite ends. The rotation of the shaft 21 causes all four of the central pinions or sun wheels 6 to rotate in the opposite directions that are indicated by arrows in FIGS. 1 and 2 of the drawings through the intermediary of the pinions 23, 25 and 26 and the shafts 24 and 3A. Rotation of the central pinions or sun wheels 6 is transmitted to the outer pinions or planet wheels 15 and, accordingly, each set of three outer pinions or planet wheels 15 rotates in a direction opposite to the direction of rotation of the corresponding central pinion or sun wheel 6 (see FIG. 2 of the drawings). The rotation of the outer pinions or planet wheels 15, whose shafts 12 are rotatably journalled in the upper and lower shells of the corresponding casings 7, causes the casings 7 themselves to revolve around the axes of the corresponding shafts 3A in the same directions as those shafts 3A are driven. The soil working members 18 work slightly overlapping, or at least immediately adjoining, strips of land and, if one member 18 of one group 19 should meet a serious obstacle, such as a large stone or an embedded root, the speed of rotation of that member will be considerably reduced or the member may stop rotating altogether. Since each member 18 forms a part of a corresponding sun and planet system, the result will be that the group 19 concerned will rapidly accelerate its speed of rotation, as a whole, around the axis of the corresponding shaft 3A so that, in most cases, the obstructed member 18 will circumnavigate or otherwise free itself from the obstacle after which normal rotation will be resumed.

The cultivator construction that has been described with reference to FIGS. 1 to 3 of the drawings affords a high degree of protection for the tines 17 against breakage, bending and the like by large stones, embedded roots and other obstacles that may be met with in the soil. The described construction is also particularly readily capable of dealing satisfactorily with compacted or other hard regions of soil. During operation, at least one member 18 will be located rearwardly, with respect to the direction A, of at least one further member 18 of the same group 19 and it will be realised that the sun and planet systems are such that the speeds of rotation of the members 18 of each group 19 will be inversely proportional to the speed of rotation of the whole group 19 about the axis of the corresponding shaft 3A. Thus, when the speeds of revolution of the individual members 18 are at a maximum, the whole group 19 will be rotating about the axis of the corresponding shaft 3A at a minimum speed and vice versa. A very effective and homogeneous crumbling of the soil is produced by the cultivator as a result of the construction which has been described and which is illustrated in the accompanying drawings, the cultivator functioning in the manner of a rotary harrow. The level of the axis of rotation of the roller 31 relative to the level of the remainder of the cultivator can be adjusted by turning the arms 28 upwardly or downwardly about their pivotal connections to the struts 27A and subsequently tightening those connections to maintain the chosen adjustment. The level of the axis of rotation of the roller 31 that is chosen is a primary factor in determining the depth of penetration of the tines 17 of the soil working members 18 into the ground during the use of the cultivator. During operation the tines leave the subsoil beneath the surface and the topsoil at the surface of the ground, sothat the soil will not dry out and germination of the seed is improved.

Although various features of the cultivator that has been described and/or that is illustrated in the accompanying drawings will be set forth in the following claims as inventive features, it is emphasised that the invention is not necessarily limited to those features and that includes each of the parts of each of the cultivators that has been described, and/or that is illustrated in the accompanying drawings, both individually and in various combinations.

What we claim is:

1. A soil cultivator comprising a frame movable over the ground and soil working means supported on said frame, said soil working means including a plurality of rotors mounted on respective, substantially central shafts, said rotors being positioned side-by-side transverse to the direction of normal travel of said cultivator to work adjoining strips of land and the shafts of adjacent rotors being driven in relative opposite directions, each rotor being rotatable about a first upwardly extending axis defined by the corresponding central shaft on that rotor, and driving means, comprising a pinion transmission, being connected to said central shaft, said rotor having support means that is freely rotatable about said central shaft and said support means mounting a plurality of soil working members, said members being rotatable about corresponding upwardly extending axes defined by further shafts journalled on said support means, said driving means being drivenly connected to said further shafts and the latter extending substantially parallel to said first mentioned shaft, said soil working members comprising substantially horizontal elongated tine supports and tines extending downwardly from the outer ends of said supports.

2. A cultivator as claimed in claim 1, wherein said support means comprises a common support and said soil working members are mounted on said common support, said common support being disc-shaped with its general plane substantially perpendicular to that shaft.

3. A cultivator as claimed in claim 1, wherein each rotor comprises a plurality of soil-working members drivingly connected to a sun and planet gear system, the corresponding further shafts of said soil-working members being driven by planet pinions of that system during operation.

4. A cultivator as claimed in claim 3, wherein said planet pinions have diameters substantially the same as that of a central sun pinion and said sun pinion is mounted on said central shaft.

5. A cultivator as claimed in claim 1, wherein said support means comprises a substantially circular casing and said casing support, said substantially circular casing surrounds the pinions of said sun and planet system and supports the corresponding shafts of the soil-working members.

6. A cultivator as claimed in claim 5, wherein said casing has upper and lower bearings and said central shaft and further shafts are journalled in said bearings.

7. A cultivator as claimed in claim 5, wherein each soil working member comprises two tines and the distance between the axis of rotation of two soil-working members of a rotor is about twice the distance between said two tines of a single soil-working member.

8. A cultivator as claimed in claim 5, wherein said casing comprises two relatively detachable circular shell portions which are substantially identical.

9. A cultivator as claimed in claim 1, wherein said rotor comprises three soil-working members that are angularly spaced apart from one another at 120° intervals around said first axis of rotation.

10. A soil cultivator comprising a frame movable over the ground and soil working means supported on said frame, said soil working means including a plurality of rotors mounted on respective, substantially central shafts, said rotors being positioned side-by-side transverse to the direction of normal travel of said cultivator to work adjoining strips of land and the shafts of adjacent rotors being driven in relative opposite directions, each rotor having a common support that is freely rotatable about a first upwardly extending axis defined by the corresponding central shaft on that rotor, driving means comprising a pinion transmission, being connected to said central shaft, a plurality of soil working members being mounted on said common support and positioned around said central shaft, said members being rotatable about corresponding upwardly extending axes defined by further shafts journalled on said common support, said driving means comprising sun and planet gears that drivenly interconnect said further shafts to said central shaft and the latter extending substantially parallel to said further shafts, said soil working members each comprising a substantially horizontal elongated tine support and at least one tine extending downwardly from said support.

11. A cultivator as claimed in claim 10, wherein an elongated supporting roller is pivoted to the frame and located to the rear of said rotors, adjusting means interconnecting said roller to the cultivator and said roller being vertically adjustable relative to the rotors to regulate the working depths thereof.

* * * * *